Feb. 24, 1970     H. M. COUSINS     3,496,994
AIR RECIRCULATING HEAT EXCHANGE SYSTEM
Filed June 25, 1968     2 Sheets-Sheet 1
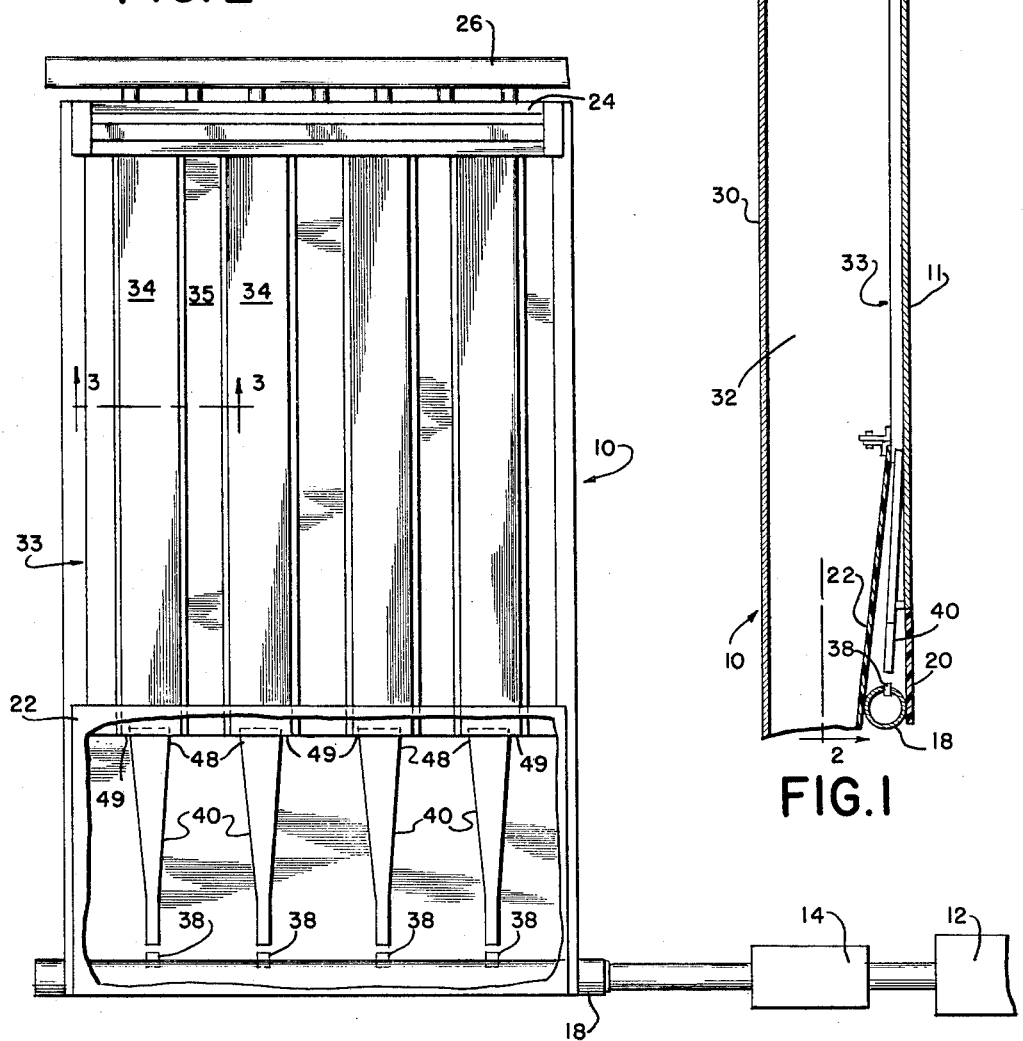
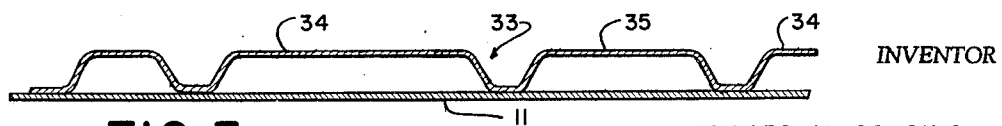
INVENTOR
HOWARD M. COUSINS
BY *William G. Gapcynski*
ATTORNEY Feb. 24, 1970 H. M. COUSINS 3,496,994
AIR RECIRCULATING HEAT EXCHANGE SYSTEM
Filed June 25, 1968 2 Sheets-Sheet 2
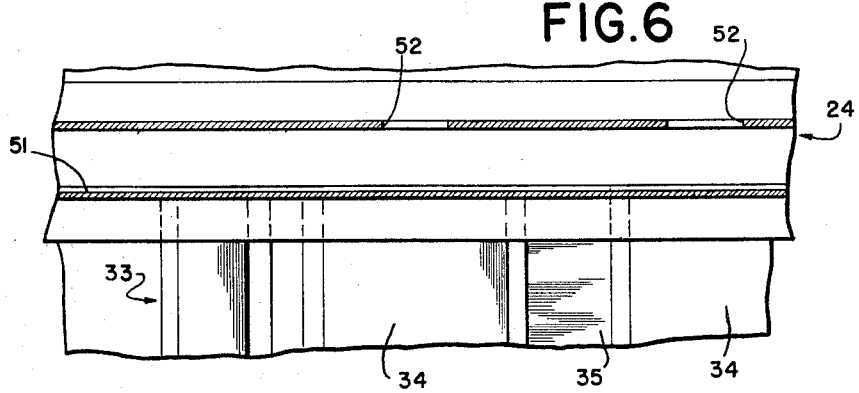
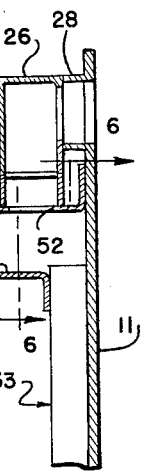
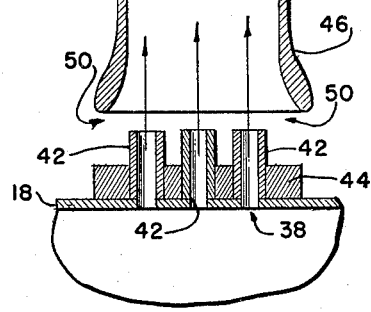
INVENTOR
HOWARD M. COUSINS
BY William G. Gapcynski
ATTORNEY

United States Patent Office 3,496,994
Patented Feb. 24, 1970

3,496,994
AIR RECIRCULATING HEAT EXCHANGE SYSTEM
Howard M. Cousins, Northridge, Calif., assignor to the United States of America as represented by the Secretary of the Army and/or the Administrator of the Federal Aviation Administration
Filed June 25, 1968, Ser. No. 739,678
Int. Cl. F28f *13/06;* F24f *3/04;* F24h *9/04*
U.S. Cl. 165—41                                       2 Claims

ABSTRACT OF THE DISCLOSURE

The disclosure describes an apparatus utilized by an air heat exchange and supply system within a vehicle wall, whereby the air recirculates for continued heat transfer with the wall prior to being exhausted to the interior of the vehicle.

BACKGROUND OF THE INVENTION

Field of the invention

This invention relates to an improvement in an air heat exchange apparatus for a vehicle which also supplies some of the same air to the interior of the vehicle. More specifically, the invention relates to a corrugated panel and diffuser system wherein air that has undergone heat transfer in one pass through the wall is recirculated for additional heat transfer prior to being exhausted to the interior.

Description of the prior art

One cooling system for supersonic aircraft has already been designed to utilize the same air for supplying the needs of the occupants which previously cooled the walls of the aircraft. This system is illustrated on page 15 of the ASME Report entitled "Thermal Management of the Lockheed Model 2000 Supersonic Transport" presented to the Aviation and Space Conference, March 14–18, 1965. The difficulties of this system are that the air passes along the wall only once, and through a myriad of small tubes each of which must be separately manufactured and separately assembled to the wall. The result is that a higher heat gain by the air occurs, due to the temperature of the air being considerably less than that of the wall inasmuch as the air is not recirculated. Because the tubes must be spaced from the trim panel by about one-half an inch, the space otherwise available for insulation is cut down, which again results in more heat transfer. In addition, the total cost of manufacture and assembly of these tubes is considerable.

SUMMARY OF THE INVENTION

This invention provides a recirculating apparatus which reduces the heat transfer between the air and the wall of the vehicle by 30% in comparison with that which occurs in the above-stated prior art. This is accomplished by utilizing, instead of a large number of small one-way tubes for the heat transfer, a corrugated panel heat exchanger and means for recirculating, for additional heat transfer, some of the air back through the panel to the point where incoming air initially leaves an intake manifold, prior to the air being exhausted to the interior of the vehicle.

Accordingly, it is an object of this invention to provide an improved heat exchange apparatus which gives satisfactory interior wall temperatures while allowing a minimum of heat transfer between the apparatus and the vehicle wall.

It is a further object to provide a heat exchange apparatus of the above character which has a minimum cost of manufacturing and assembly.

Other objects and advantages of the invention will become apparent upon reference to the following drawings and detailed discussion.

BRIEF DESCRIPTION OF THE DRAWINGS

FIG. 1 is a fragmentary partial section of a wall panel constructed according to the invention;

FIG. 2 is a section of the panel of FIG. 1 taken generally along the line 2—2 in FIG. 1 with the chamber cover partially cut away;

FIG. 3 is a section of the corrugated panel taken along the line 3—3 of FIG. 2;

FIG. 4 is an enlarged fragmentary section of a diffuser and the intake manifold;

FIG. 5 is an enlarged fragmentary section of the exhaust manifold and distribution pipes; and FIG. 6 is a fragmentary section of the exhaust manifold taken generally along the line 6—6 of FIG. 5.

DESCRIPTION OF THE PREFERRED EMBODIMENT

The invention is utilized in connection with an air heat exchange and supply system wherein the air exchanges heat with the wall 10 of a vehicle having an impervious interior trim panel 11, prior to the air being exhausted to the interior of the vehicle. A fresh air source 12 supplies air under pressure to a conventional heat exchanger 14. From this exchanger the air moves into an intake manifold 18 which is positioned between a back panel 20 which forms part of the interior wall 11, and an intake chamber cover 22. If the vehicle is an airplane, the air source may be ram air, and the heat exchanger may include air-to-air and fuel-to-air heat exchangers. After undergoing heat exchange with the interior of the wall, the air is exhausted to the interior of the vehicle through an exhaust manifold 24, a distribution duct 26, and several vent ducts 28 spaced along the duct 26. Again, if the vehicle is an aircraft, aerodynamic heat flows from the outer skin 30 of the wall, through insulation 32 within the wall, and to the air flowing next to the interior trim panel 11. After use by the occupants of the vehicle, the air is removed using conventional equipment.

In accordance with my invention, instead of using many small one-way tubes to flow the air next to the trim panel 11 for the heat exchange, my improvement utilizes as the heat exchanger an integral corrugated recirculating panel 33 having alternating outgoing and returning corrugations 34 and 35, respectively (FIG. 3), wherein heat is exchanged between the air and the outer skin 30. The panel need be only 0.25 inch in height. To supply the air to the panel 33 from the intake manifold, sets of nozzles 38 and diffusers 40 are spaced periodically along the intake manifold (FIG. 2), each set of nozzles consisting of one or more tubes 42 fitted into a block 44 which is welded to the manifold (FIG. 4). The diffusers consist of a narrow throat 46 and a wide end piece 48 which fits into one end of the panel 33. To allow for recirculation of some of the air back through the panel 33, the wide ends 48 of the diffusers are positioned only in the outgoing corrugations 34 so that the corrugations 35 allow air to return to the diffusers (FIG. 2). To draw the returned air back for mixing in the diffuser at the point where outgoing air leaves the intake manifold, spaces 49 are positioned around the wide ends 48 of the diffusers to close off access to the channels 34, and the nozzles 38 are spaced from the throat 46 of the diffuser so as to form a low pressure gap 50. To allow recirculation of most of the air while allowing delivery of the rest to the distribution duct, the panel 33 opens into the back side 51 of the exhaust manifold 24 (FIG. 6).

Because of this structure, after the first passage through the outgoing corrugations 34 of the panel 33 some of the air is recirculated back through the return corrugations 35 to the diffuser rather than drawn off by the exhaust manifold. Additional heat transfer is obtained during the passage through the return corrugations 35, utilizing some of the same air as used before. Still more heat transfer is obtained on the air's second passage through the corrugations 34. But because the air's temperature is now closer to that of the wall, the amount of heat transfer is less. In addition, because the temperature differential between the wall and the air is small, the corrugated panel 33 can fit snugly to the trim panel leaving more room for the insulation section 32. More insulation in turn cuts down the amount of heat transferred between the outer skin 30 and the air. Eventually, all of the air is exhausted to the interior of the cabin through the manifold 24, the distribution duct 26, and vent ducts 28, but by this time the heat transfer has been sufficient to bring the temperature of the air to that desired for the interior.

In accordance with another aspect of my invention, to transfer some of the air from the exhaust manifold to the distribution duct, openings 52 are positioned in the exhaust manifold opposite each of the corrugations 34 and 35, and pipes 54 fitted therein are coupled to the duct 26. The amount of air that is recirculated before being exhausted to the interior is controlled by the size of the openings 52 and the nozzles 42, and may be from one to three times the amount of air injected by the nozzles, the exact amount being determined by the expected temperature of the outer skin 30, the temperature of the air as it enters the intake manifold, and the desired temperature of the vehicle interior and trim panel. In the event the vehicle is a supersonic airplane, the unit 14 refrigerates the air to about −20° F. and aerodynamic heat is transferred in the panel 33 from the wall to the air. By the time the air in its mixed form has reached the end 48 of the diffuser, it has heated up to 33° F. When it reaches the exhaust manifold, sufficient heat has been transferred to it to raise the temperature to about 50° F. Recirculation then provides the mixing air to raise the temperature of the diffuser end 48 to 33° F. By the time the air eventually is exhausted to the interior of the vehicle, it is at a temperature of 70° F Because the length of the panel 33 is cooler than the interior, it tends to cool the trim panel 11 to about 65° F.

While the invention has been described in connection with a preferred embodiment, it till be understood that I do not intend to limit the invention to that described. On the contrary, I intend to cover all alternatives, modifications and equivalents as may be included within the spirit and scope of the invention as defined by the following claims.

I claim:
1. In a vehicle wall air recirculating heat exchange system utilized for exhausting air to the interior of the vehicle after that air has undergone a heat transfer with the wall, comprising an air source, an intake manifold, and an exhaust manifold, the improvement comprising:
 (a) a corrugated panel heat exchanger having alternating outgoing and return corrugations; and
 (b) means for recirculating some of the air in the exhaust manifold back through said return corrugations to the point where the incoming air leaves the intake manifold.
2. The improvement as defined in claim 1 wherein said means includes:
 (a) a plurality of outlet nozzles on the intake manifold;
 (b) a plurality of diffusers spaced from said nozzles, said diffusers being coupled to said panel at the outgoing corrugations.

References Cited
UNITED STATES PATENTS

| | | | |
|---|---|---|---|
| 1,942,831 | 1/1934 | Perry | 165—123 |
| 2,097,602 | 11/1937 | Rohlin | 165—108 |
| 2,205,001 | 1/1940 | Timmis et al. | 165—49 |

ROBERT A. O'LEARY, Primary Examiner

CHARLES SUKALO, Assistant Examiner

U.S. Cl. X.R.
165—55, 108, 123